C. CLIFFORD.
Fermenting Vat.
No. 63,994.
Patented Apr. 23, 1867.
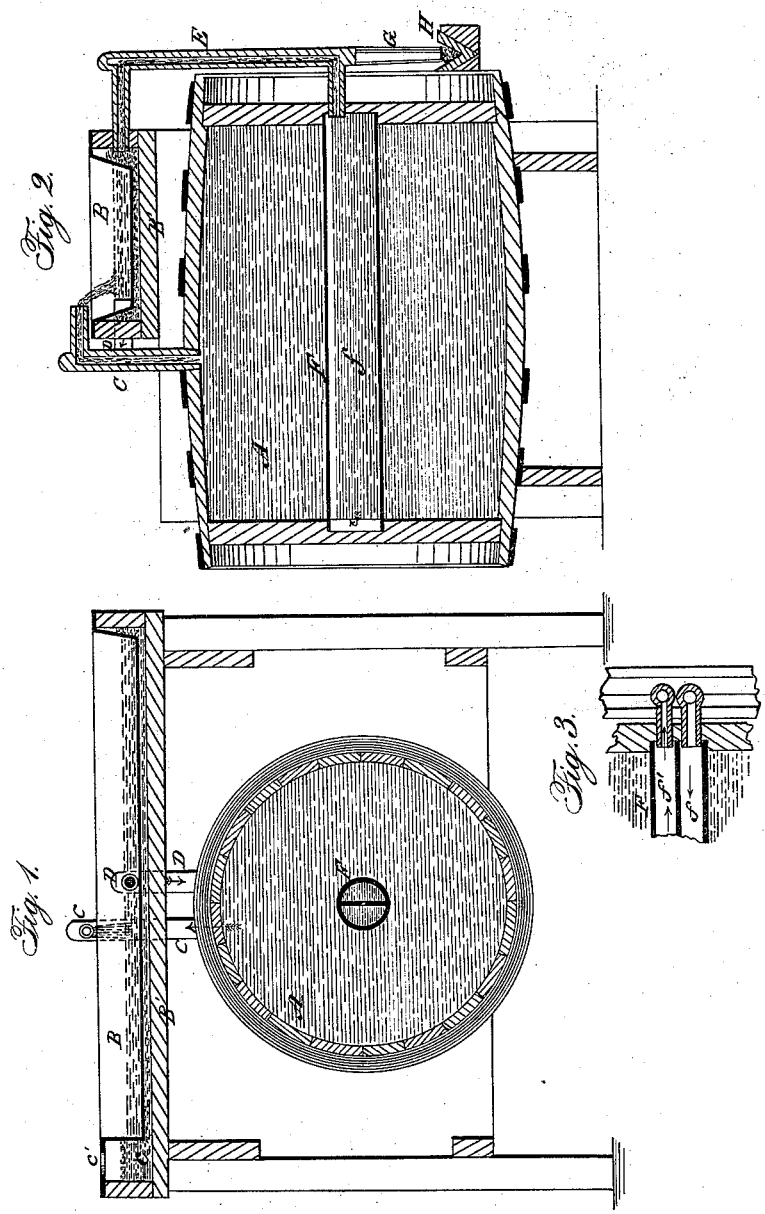

United States Patent Office.

CARLETON CLIFFORD, OF ADAMS, NEW YORK, ASSIGNOR TO HIMSELF, A. W. LAKE, AND T. P. SAUNDERS, OF THE SAME PLACE.

Letters Patent No. 63,994, dated April 23, 1867.

IMPROVEMENT IN BREWING ALE.

The Schedule referred to in these Letters Patent and making part of the same.

TO ALL WHOM IT MAY CONCERN:

Be it known that I, CARLETON CLIFFORD, of Adams, in the county of Jefferson, and State of New York, have invented a new and useful Improvement in Brewing Ale; and I do hereby declare the following to be a full and exact description of the same, reference being had to the accompanying drawings, which are made part of this specification, and in which—

Figure 1 is a vertical transverse section of a cask and its appurtenances, illustrating my invention.

Figure 2 is a vertical longitudinal section of the same; and

Figure 3 is a detached view.

Similar letters of reference indicate corresponding parts in the several figures.

Under the ordinary process of brewing ales, the ale after passing from the coolers is put into casks, where it is allowed to stand for some days in order that the yeast and impurities may be thrown off and separated from the ale by slow fermentation. These casks have heretofore consisted simply of vessels open at top so as to allow the yeast to flow out over the sides as it is heaved up by fermentation; and hence the ale while under this treatment is subjected to waste and injurious exposure to the atmosphere, and a fresh quantity of ale has to be supplied occasionally to keep the casks well filled.

The object of my invention is to overcome the above-named objections, and to this end it consists in making the cask close and tight, and inserting into its top a tube, which discharges the yeast into an elevated trough in which the good ale discharged with the yeast is allowed to settle, and from which said ale is returned to the cask by a conducting tube as hereinafter explained.

My improvement also embraces a novel method of applying cold water for the purpose of regulating the temperature and preventing undue fermentation of the ale.

In order that other skilled in the art to which my invention appertains may be enabled to fully understand and use the same, I will proceed to describe it in detail.

In the drawing, A is a close cask mounted in a suitable frame, which may also serve to sustain the elevated metallic box or trough B, which is set within the water-box B'. C is a bent tube leading from the cask A, and projecting upward therefrom, and terminating at a point above the trough B, into which it discharges the yeast and impurities thrown off or upward from the ale in the cask. The greater specific gravity of the good ale which is discharged into the trough B with the yeast, etc., causes it to settle to the bottom of said trough, in close contact with which is the mouth of the tube D which conveys the good ale back to the cask. The yeast may be removed from the trough B as often as required. A water space, $c$, surrounds the bottom and sides of the trough B, the water being introduced through the opening $c'$, fig. 1, and having the effect to cool the contents of trough B and cause the good ale to settle therein. E is a pipe which conducts the water from the space $c$ to the tube or cylinder F, which is fixed centrally within the cask A, as represented. The tube F is divided longitudinally into two chambers $ff'$. The water is discharged from pipe E into chamber $f$, and after traversing the length of the latter is led into chamber $f'$, which returns the water to the ingress end of the cylinder and discharges it through pipe G into gutter H.

This method of applying water as a cooling medium will effectually prevent undue fermentation, and enables me to continue the brewing process during the warm months, in which the business has heretofore been suspended to a great extent.

The use of the apparatus is not confined to the treatment of ale, as it may be employed for all liquids which have to undergo fermentation. It is evident that modifications of construction and arrangement may be effected without changing the essential principles of my invention.

Having thus described my invention, the following is what I claim as new herein, and desire to secure by Letters Patent:

1. I claim the close cask or tank A, provided with the discharge tube C or its equivalent, and employed to contain ale or other liquor while undergoing fermentation, substantially as and for the purpose specified.

2. I claim the combination, with the above, of the elevated receiving trough or box B, and return tube D, arranged substantially as and for the purpose specified.

3. I claim the water-chamber $c$, in combination with the receiving trough B, substantially as described.

4. I claim the combination of the cask A, tubes C D, trough B, box B', pipe or tube E, and water-cylinder F, all arranged substantially as and for the purpose specified.

The above specification of my invention signed by me this      day of      1867.

CARLETON CLIFFORD.

Witnesses:
R. RIPLEY,
H. F. OVERTON.